United States Patent [19]

Nicholson

[11] Patent Number: 4,915,397

[45] Date of Patent: Apr. 10, 1990

[54] HOLLOW METALLIC SEALING RINGS

[75] Inventor: Terence P. Nicholson, Durham, England

[73] Assignee: Specialist Sealing Limited, United Kingdom

[21] Appl. No.: 879,490

[22] Filed: Jun. 27, 1986

[30] Foreign Application Priority Data

Feb. 7, 1986 [GB] United Kingdom ............... 8603034

[51] Int. Cl.⁴ .............................................. F16J 15/08
[52] U.S. Cl. .................... 277/206 R; 277/236; 285/917
[58] Field of Search ............... 277/206 R, 226, 236, 277/167.5; 285/917, 336, 335

[56] References Cited

U.S. PATENT DOCUMENTS

| 267,750 | 11/1882 | Katzenstein | 277/226 |
|---|---|---|---|
| 1,661,878 | 3/1928 | Cromwell | 277/226 |
| 1,770,548 | 7/1930 | Oven | 277/236 X |
| 2,360,731 | 10/1944 | Smith | 277/177 |
| 2,360,734 | 10/1944 | Smith | 277/226 X |
| 3,163,431 | 12/1964 | Tanner | 277/206 R |
| 3,352,006 | 11/1967 | Satoh et al. | 277/226 X |
| 3,520,544 | 7/1970 | Taylor | 277/236 X |
| 3,761,102 | 9/1973 | Nicholson | 277/206 R |
| 3,843,138 | 10/1974 | Cobb | 277/236 X |
| 4,121,843 | 10/1978 | Halling | 277/206 R X |
| 4,218,067 | 8/1980 | Halling | 277/236 X |
| 4,261,584 | 4/1981 | Browne et al. | 277/206 R |
| 4,508,356 | 4/1985 | Janian | 277/164 X |

OTHER PUBLICATIONS

"United Metallic O-Rings"; Bulletin No. 596191B, by United Aircraft Products, Inc., Dayton, Ohio, Jul. 15, 1959; pp. 3–7.

Primary Examiner—Allan N. Shoap
Attorney, Agent, or Firm—Fidelman & Wolffe

[57] ABSTRACT

A hollow metallic sealing ring of low-load, self-energizing, static kind is characterized in that in radial cross-section it is of modified parabolic form with convergent margins (M) with a radial width, in its relaxed state, which is equal to substantially 7/8ths (0.875) of its maximum length (A) measured in the direction parallel to the axis of the ring.

3 Claims, 2 Drawing Sheets

HOLLOW METALLIC SEALING RINGS

This invention relates to hollow metallic sealing rings of the so-called low-load, self-energising, static kind as used for instance in pumps, motors and other apparatus to form leakproof seals between opposed usually plane, parallel surfaces.

At the present time it is the practice to use for the above purpose metallic sealing rings which, in radial cross-section, are alternatively of circular, 'C', or parabolic shape but all of these forms have attendant disadvantages which are hereinafter mentioned.

It is accordingly the general object of the present invention to provide an improved hollow metallic sealing ring which has an enhanced load recovery characteristic and which cannot damage the surfaces between which it is located.

The hollow metallic sealing ring in accordance with the present invention is characterised in that in radial cross-section it is of modified parabolic form with convergent margins and that in its relaxed state its radial width is equal to substantially $\frac{7}{8}$ths of its maximum length (A) measured parallel to its centre axis. Further, and preferably, successive adjoining parts of the wall of the ring towards and each side of the median diametric plane of the ring have radii of curvature of A/2, A and A/4 respectively.

The invention is hereinafter described by reference to FIGS. 1 to 8 of the accompanying drawings in which.

Figure 1:
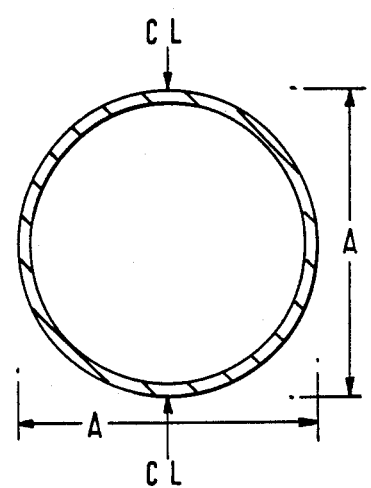
FIGS. 1 to 3 are radial axial cross-sections of three commonly used hollow metallic sealing rings (prior art)

Referring now to the drawings, in each of FIGS. 1 to 5, CL indicates the centre line of application of the compression load applied to a hollow metallic sealing ring parallel to its centre axis whilst A indicates the maximum length of the ring when in its relaxed uncompressed state. In the prior art rings shown in FIGS. 1 and 3 their radial width measured along the median radial plane is the same as dimension A whilst in the prior art ring shown in FIG. 2 the aforesaid radial width is less than dimension A.

Figure 2:
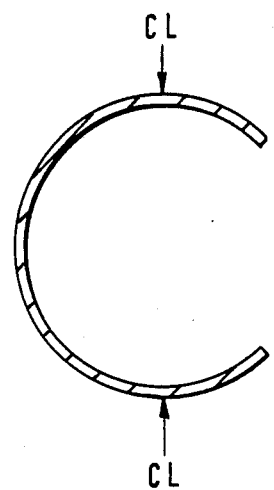
Figure 3:
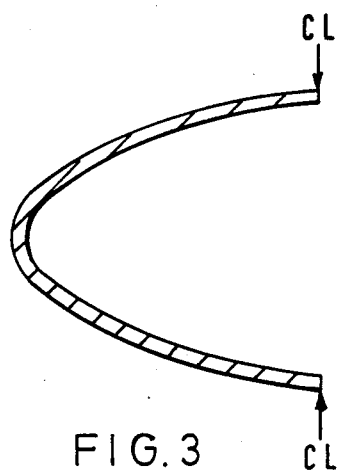

The sealing rings shown in FIGS. 1 and 2 function somewhat differently from that shown in FIG. 3. In the former the line CL coincides with the diametric centre and because of this the rings tend to adopt an almost permanent set when they are compressed, i.e. there is very little recovery or resilience and this is their major disadvantage. The usual way of trying to overcome this is to arrange for the ring to be an interference fit on its inside and/or outside with the cavity in which it is located.

In the parabolic formation of ring shown in FIG. 3 the line CL is at the radially inward extremities but although this ring has extremely good resilience or recovery characteristics it unfortunately has the disadvantage that as it is compressed its extremities scrape and damage the mating surfaces which are to be sealed. This disadvantage is particularly serious when the ring is forming a seal between lightweight flanges in pumping installations.

Figure 4:
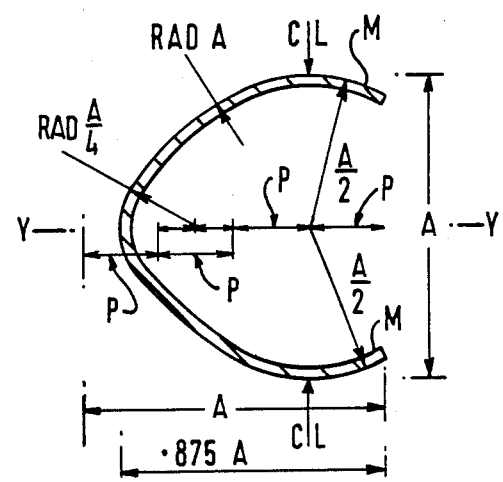
FIG. 4 is a view analagous to FIGS. 1 to 3 of a first embodiment of the invention.

A first embodiment of sealing ring as shown in FIG. 4 is of somewhat parabolic axial radial section with convergent margins M and a radial width dimension of $\frac{7}{8}$ or 0.875 A where, as indicated above, A is the maximum length measured along the line C/L of the ring in it's relaxed uncompressed state. Further, the curvature of successive adjoining parts of the wall of the ring towards and each side of the median plane Y—Y of the ring is predetermined. Thus the convergent margins have radii of curvature A/2, with the next adjoining part thereof having a radius of curvature A, and the next adjoining part (the vertex of the modified parabolic form) thereof having a radius of curvature of A/4. The median plane Y—Y is shown as divided into four equal parts P each of length A/2 from which the points of intersection of the radii A/2 and A/4 can be seen in FIG. 4. The centre line of compression CL can be seen to extend through the centre of radius A/. This allows the edges of the margins or lips of the ring to be free and operate without restraint. Also the wall portion with a radius of curvature A, which is situated between those portions having radii of curvature A/2 and A/4, can deform freely. This means that there is no sliding whatsoever relative to the mating surfaces. Unfettered movement of the lips or margins M and of the wall portions with radii of curvature A allows the ring to operate with complete freedom and with the possibility of achieving almost 100% resilience, a factor of considerable importance if successful sealing, particularly in nuclear applications, over a long period is to be achieved.

Figure 5:
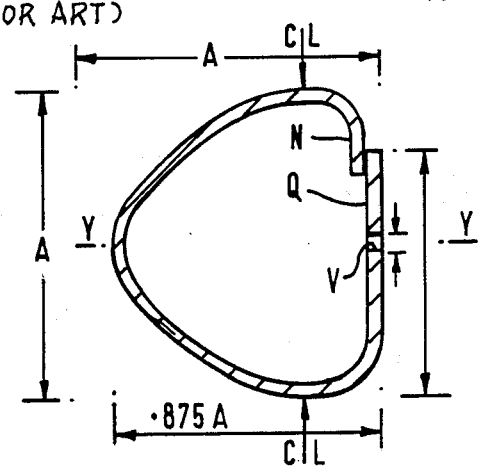
FIG. 5 is a view analagous to FIGS. 1 to 4 of a second embodiment of the invention.

In the second embodiment of the invention, illustrated in FIG. 5, the radial width of the ring measured along the median plane Y—Y is again 0.875A where A is the undeformed axial length of the ring and the successive radii are the same as for the first embodiment. The margins or lips N, Q in the second embodiment are however of unequal length and turned into parallel slightly overlapping relationship, the longer lip Q being optionally formed with a vent hole V.

Figure 6:
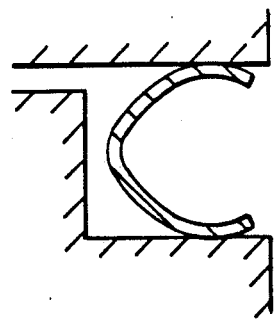
FIGS. 6 and 7 are diametric axial cross-sections of two typical installations of the embodiment shown in FIG. 4.
Figure 6:
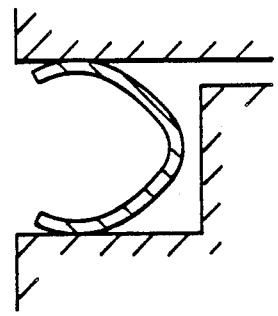
Figure 7:
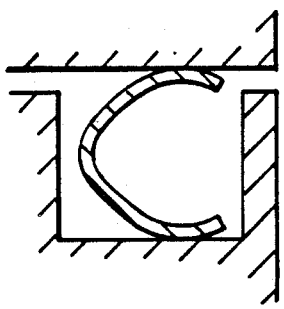
Figure 7:
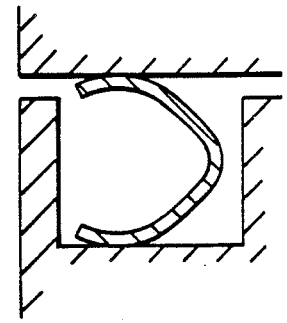
Figure 8:
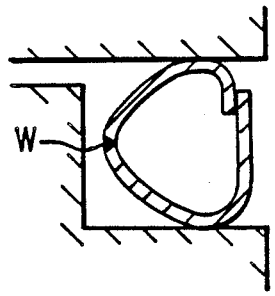
FIG. 8 is a diametric axial cross-section of an installation of the embodiment shown in FIG. 5.
Figure 8:
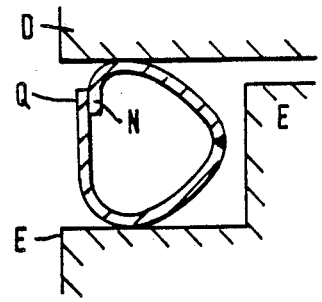

FIGS. 6, 7 and 8 show the two sealing ring embodiments in typical flange sealing situations prior to compression.

Thus FIG. 6 shows the FIG. 4 ring located in an open recess which in the main is perfectly suited for gases and pure liquids.

FIG. 7 shows the FIG. 4 ring located in a totally enclosed recess, as is preferred when used in food applications or where there is the possiblity of foreign matter in the gas or liquid.

FIG. 8 shows the FIG. 5 ring located in an open recess. Due to the extended overlapping lips N, Q the recovery factor on a more permanent basis is increased; it also prevents the cavity from filling with any extraneous matter.

However, when the two flanges D and E are clamped together, the flange D also comes to rest very firmly on the upper edge of the lip Q creating a secondary seal. From an economical aspect these rings usually have to be manufactured in two halves and circumferentially welded together at W.

In this application it can be advantageous to drill a number of vent holes around the inside diameter to allow high pressure gas to fill the ring and thereby increase the load on the ring at its contact points with the mating faces. This is also helpful when the sealing surfaces of the mating faces are of doubtful quality.

These rings are usually supplied in either stainless or high nickel alloys, usually in their work hardened condition or heat treated to increase their spring characteristics.

Because these are made in these strong and relatively hard metals, it becomes difficult for any surface asperities of the mating faces to be filled and so provide a leaktight seal. This problem is completely removed by coating the seals with any of the well-known coatings such as PTFE, Gold, Silver, Nickel, Copper, and so forth.

I claim:

1. A hollow, annular metallic sealing ring surrounding a central longitudinal axis generally perpendicular to a median plane of said ring, and comprising:

radially spaced inner and outer portions of said ring, at least one of which portions is closed;

said ring having a cross-sectional configuration of modified parabolic form when in a relaxed state, with a maximum depth along a center line of compression of said ring in a direction generally parallel to said axis, a width between said inner and outer portions along a radius from said axis and equal to substantially ⅛ of said maximum depth, each arm of said modified parabolic form diverging symmetrically on each side of said median plane from said closed portion and having a radius of curvature substantially equal to one-fourth of said maximum depth to the other of said inner and outer portions having a radius of curvature substantially equal to one-half of said maximum depth such that said arms converge, said inner and outer portions being joined on each arm by an intermediate portion having a radius of curvature substantially equal to said maximum depth.

2. The sealing ring of claim 1, wherein said converging arms have extensions which are extended towards each other, and wherein said extensions overlap each other in a generally parallel relationship.

3. The sealing ring of claim 1, wherein said ring is disposed in an annular cavity defined by a pair of opposed surfaces, said ring and cavity defining, in combination, an annular joint.

* * * * *

UNITED STATES PATENT AND TRADEMARK OFFICE
CERTIFICATE OF CORRECTION

PATENT NO. : 4,915,397

DATED : April 10, 1990

INVENTOR(S) : Terence P. NICHOLSON

It is certified that error appears in the above-identified patent and that said Letters Patent is hereby corrected as shown below:

On the title page:
At Block [73] Assignee: add after "United Kingdom" --(part interest)--.

Signed and Sealed this

Thirtieth Day of June, 1992

Attest:

DOUGLAS B. COMER

*Attesting Officer*  *Acting Commissioner of Patents and Trademarks*